March 16, 1937.  W. W. WARNER  2,074,135
MOTOR MOUNTING
Filed Nov. 15, 1934
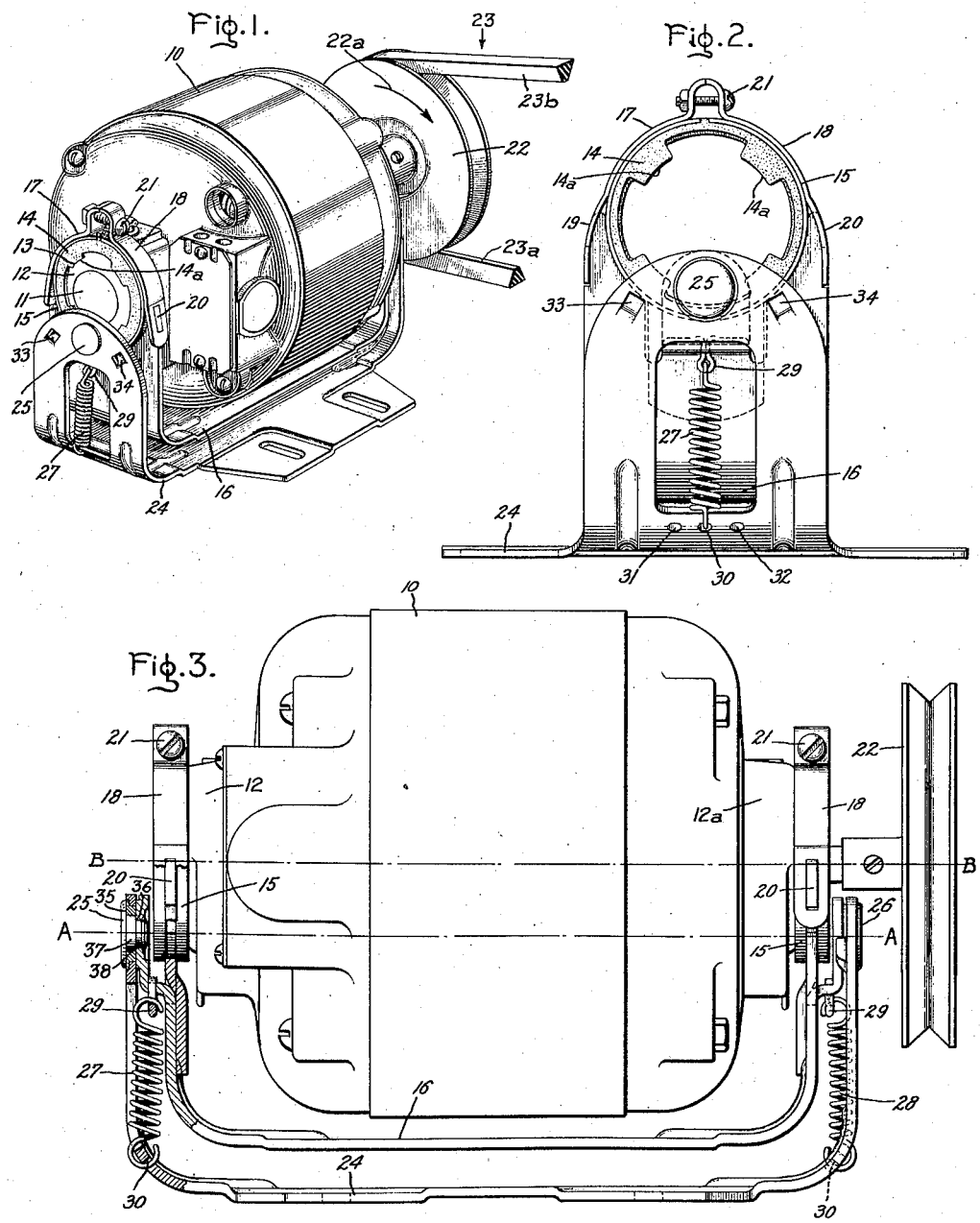
Inventor:
Wilbur W. Warner,
by Harry E. Dunham
His Attorney.

Patented Mar. 16, 1937

2,074,135

UNITED STATES PATENT OFFICE 2,074,135

MOTOR MOUNTING

Wilbur W. Warner, Fort Wayne, Ind., assignor to General Electric Company, a corporation of New York Application November 15, 1934, Serial No. 753,112

26 Claims. (Cl. 74—242.9)

My invention relates to supports for dynamo-electric machines or the like.

Dynamo-electric machines are frequently used to drive compressors, pumps or the like through a belt or other flexible, frictional driving connection. When such a driving connection is employed the torque transmitted from the dynamo-electric machine to the driven machine is an inverse function of the slippage in the driving connection. If fixed centers for the driving and driven pulleys are used the friction in the driving connection may be increased by tightening the belt to such an amount that slippage therein is prevented even at the maximum rated load, but in that case the friction is increased beyond the amount necessary to prevent slippage in the driving connection at lighter loads and there will be an unnecessary strain on the driving connection. In the case of a belt, for example, it would be stretched and worn unduly if it were always kept tight enough to prevent slippage at all loads. Moreover, it is desirable to allow some slippage in the driving connection at starting since the inertia of the driven member causes the load to be heavy at that time and if no slippage is allowed the dynamo-electric machine would draw an excessive current at starting. This latter feature is especially undesirable when a dynamo-electric machine is used which inherently requires a large starting current. These requirements make it desirable to provide some arrangement for varying the friction in the driving connection in accordance with variations in load and speed.

It is an object of my invention to provide an arrangement for movably supporting a dynamo-electric machine or the like having a flexible, frictional driving connection, which is adapted to utilize a displacing force exerted on the machine by the driving connection to increase the friction in the driving connection in accordance with increase in load during ordinary running of the dynamo-electric machine.

It is a further object of my invention to provide a support for a dynamo-electric machine or the like having a flexible frictional driving connection, which is adapted to produce sufficient friction in the driving connection at starting to make the same effective to drive the load, while permitting some slippage in the driving connection in starting.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a perspective view of a dynamo-electric machine provided with a support embodying my invention; Fig. 2 is an end elevation of the support shown in Fig. 1, and Fig. 3 is a side elevation of the support and motor shown in Fig. 1, the support being partly in section.

Referring to the drawing, I have shown in Fig. 1 a dynamo-electric machine having a stationary member 10 and a rotatable member mounted therein on a shaft 11, the ends of which are journaled in hubs 12 and 12a. This machine is resiliently supported by providing axial grooves 13 in the surface of hubs 12 and 12a, which are engaged by the complementary projections 14a on the inner surface of two resilient supporting annuluses 14 which may be made of rubber, or the like. The resilient annuluses 14 are surrounded by metal rings 15 which are bonded thereto, this assembly being supported in the open ends of a U-shaped sheet metal cradle 16 and clamped therein by clamping members 17 and 18 at opposite ends of the machine. The lower ends of clamping members 17 and 18 are provided with slots fitted on projections 19 and 20, respectively, on the ends of cradle 16, the upper ends of clamping members 17 and 18 being held together by bolts 21. The rotatable shaft 11 is provided with a V-grooved pulley 22 which engages a V-belt 23, the latter forming a flexible, frictional driving connection with a driven machine.

The resilient cushioning support hereinbefore described is not my invention, but is the invention of Alfred F. Welch and is described and claimed in his application, Serial No. 727,432, filed May 25, 1934, and assigned to the General Electric Company, assignee of my present invention.

I have provided a supporting arrangement which during ordinary running operation of the dynamo-electric machine, which in this embodiment of my invention is a motor, utilizes a displacing force exerted by the belt 23 on the dynamo-electric machine to tension the belt 23 in accordance with the load transmitted. This supporting arrangement includes a U-shaped sheet metal base 24 spaced from and conforming to the U-shaped cradle 16, their adjacent ends being pivotally connected by pins 25 and 26, which are in axial alinement. It will be noted that the pin 25 includes two shouldered portions 35 and 36 between which is located a bearing surface 37 engaging the cradle 24. A bearing surface 38 formed on the pin 25 supports the cradle 16, the inner end of the pin 25 being peened over the adjacent portion of the cradle 16. The pin 26 is similarly constructed. Stationary member 10 of the dynamo-electric machine is thus pivotally supported on an axis A—A passing through pins 25 and 26 which is eccentric to but closely adjacent the axis of rotation B—B of the rotatable member of the dynamo-electric machine carried on shaft 11. The supporting arrangement shown in Fig. 1 utilizes the belt tension to tighten the belt 23 on the pulley 22 when the motor is rotating in a clockwise direction as viewed in Fig. 1, which is indicated by the arrow 22a. When so rotating the lower side of the belt 23 will be the tight side of the belt and the upper side will be the loose side of the belt. The tension in the tight lower side 23a of the belt acts as a displacing force on the machine that is, it creates a torque about the pivotal axis tending to move the machine to the left in Fig. 1 and hence move the pulley 22 more tightly into the loop of the belt 23, thus tightening the belt and increasing the friction in the driving connection. As the load increases the tension in the tight lower side of the belt increases and hence the friction in the driving connection also increases. It should also be noted that the tension in the loose upper side 23b of the belt creates an opposite but lesser torque about the pivotal axis which tends to move the machine and pulley away from the belt loop and loosen the driving connection. Hence, the tightening torque exerted about the pivotal axis A—A by the tight lower side 23a of the belt must always be equal to or exceed the torque exerted about the pivotal axis A—A by the loose upper side 23b of the belt if the resultant torque, that is, the difference between the two torques mentioned, is to be such as to maintain the pulley 22 in tight frictional engagement with the belt 23. We must then examine the relation of the displacing forces exerted by the tight and loose sides of the belt 23a and 23b, respectively, in determining the proper location of the pivotal axis A—A. This relation may be expressed by the well known equation:

$$\frac{T_2}{T_1} = e^{fb}$$

where $T_2$ is the tension in the tight side of the belt, $T_1$ is the tension in the loose side of the belt, $f$ is the coefficient of friction between the belt and the pulley, $b$ is the angle of wrap of the belt on the pulley and $e$ is a constant, namely, the base of the Naperian system of logarithms. It will be understood that the angle of wrap of the belt is the angle between the radii from the pulley center passing through the points at which the belt leaves the pulley. This equation represents the necessary relation of $T_2$ and $T_1$ at a time when slippage of the belt is barely avoided. From a consideration of this equation it will be seen that as the coefficient of friction and the angle of belt wrap decrease the tensions in the two sides of the belt become more nearly equal. They will not become exactly equal except when no torque is being transmitted by the belt from the motor. In most cases the coefficient of friction and the angle of belt wrap are such that $T_2$ is several times larger than $T_1$. In the latter case it is clear that the lever arm between the pivotal axis A—A and the tight side of the belt may be substantially less than the lever arm between the pivotal axis A—A and the loose side of the belt and yet the torque exerted by the tight side of the belt will exceed that exerted by the loose side of the belt.

In the illustrative form of my invention the pivotal axis A—A has been placed closely adjacent the rotational axis B—B, so that the tightening force exerted by the tight lower side 23a of the belt will act through a lever arm which is nearly as great as the lever arm through which the loose upper side 23b of the belt acts and thus greater assurance is given that the tightening torque exerted by the tight lower side 23a of the belt will exceed the loosening torque exerted by the loose upper side 23b of the belt, even though a belt arrangement with a low coefficient of friction or small angle of wrap be used.

Consideration may now be given to the permissible location of the pivotal axis A—A in which the desired belt tightening action may possibly be had. If the pivotal axis were made coincident with the rotational axis any movement of the stationary member 10 would not cause any relative movement of pulley 22 with respect to the loop of belt 23 and hence no tightening of the belt would be had. Also if the pivotal axis were located above the axis of rotation then the torque due to the tension in the tight side of the belt would be the one tending to move the pulley 22 away from the belt loop and the torque due to the tension in the loose side of the belt would be the one tending to tighten the belt. There could never be a resultant torque tending to tighten the belt, however, since the tight side torque would always predominate due to the fact that with such a location of the pivotal axis the tight side torque would necessarily include the longer lever arm as well as the greater force. It thus becomes clear that the pivotal axis must be located on the side adjacent the tight side of the belt of a plane passing through the axis of rotation of the rotatable member and the center of the arc of contact of the driving connection. In the embodiment of my invention illustrated the center of the area of contact of the driving connection is the center of the peripheral portion of the pulley 22 in contact with the belt 23, and lies in a plane bisecting the angle of wrap. The pivotal axis must not only be on that side of such a plane, but must also be between such a plane and the line of force of the tension in the tight side of the belt. Otherwise, if the pivotal axis were located below this line of force the torque due to the tension in both sides of the belt would tend to loosen the driving connection. It is thus apparent that there are definite limits to the permissible location of the pivotal axis in which it is possible to utilize the torque exerted by the driving connection to increase the friction in the same. I prefer to construct the supporting structure in such a manner that the pins 25 and 26 are within the periphery of the driving pulley 22 since the angle of wrap of the belt 23 may then be varied at will for various sizes of driven pulleys without danger of locating the pivotal axis A—A outside the line of action of the tension in the tight side of the belt.

By the use of the resilient supporting means described above torsional vibration produced by the dynamo-electric machine is effectively cushioned by the resilient cushion rings 14. It is especially desirable to cushion such vibrations when the dynamo-electric machine is carried on a pivotal supporting arrangement of the type described, as they would otherwise tend to cause the machine to oscillate above its pivotal supporting axis and interfere with the belt tensioning function of the supporting structure.

The cradle 16 and the base 24 are connected at their opposite ends by tension springs 27 and 28. Since the lever arm between the center of gravity of the dynamo-electric machine, which is approximately at the axis of rotation, and its pivotal axis is short the springs 27 and 28 may be relatively light and still be capable of centering the machine. The upper end of tension spring 27 is secured to a loop 29 on the cradle 16 and its lower end is secured in a hole 30 in base 24. The tension spring 28 is similarly secured at the opposite end of the machine. By attaching the springs 27 and 28 to stationary member 10 at a point of greater eccentricity with respect to the axis of rotation than the pivotal axis and with the line of force of the springs passing through both of these axes, it is possible to resiliently bias the dynamo-electric machine against displacement in either direction about its pivotal axis from a center position by a single spring or other biasing means.

The springs 27 and 28 are adjusted to hold the dynamo-electric machine in a position with respect to its pivotal axis such that when at rest the pulley 22 will engage the loop of belt 23 with sufficient friction to start the load, but still allow some slippage of the belt over the pulley. Additional holes 31 and 32 may be provided in the base 24, as best shown in Fig. 2, in order that the angle of spring 27 may be changed to adjust the tension applied to belt 23 by shifting the line of force of spring 27. Similar holes are provided for adjusting the line of force of spring 28. Thus unsymmetrical weight distribution in the dynamo-electric machine due to the mounting thereon of switches, capacitors, or other auxiliary devices may be compensated, the resultant line of force of bias remaining in a plane passing through the pivotal axis of the axis of rotation. By so adjusting the springs 27 and 28 the friction between the pulley 22 and the belt 23 is limited to such an amount that the dynamo-electric machine starts under a light load with some slippage of the belt and hence will not draw an excessive or harmful current. Having so started in a clockwise direction, the torque due to the tension in the tight side of the belt will cause stationary member 10 to move in a counter-clockwise direction about its pivotal axis A—A, as described above. Pulley 22 is thus moved toward the loop of belt 23 and as the load on the dynamo-electric machine increases this tendency is enhanced so that the friction between the pulley 22 and belt 23 is increased correspondingly. Upstruck portions 33 and 34 are provided on base 24 and form stops to limit the movement of the stationary member 10 about its pivotal axis.

When a mounting arrangement constructed in accordance with my invention is employed the load is gradually applied to the dynamo-electric machine more or less in the manner of an automatic clutch. The tension in the belt is only that required to prevent slippage and unnecessary strain and wear in the belt is consequently avoided.

While I have shown a particular embodiment of my invention in connection with a dynamo-electric machine, I do not desire my invention to be limited to the particular construction shown and described, and I intend in the appended claims to cover all modifications within the spirit and scope of my invention.

What I claim as new and desire to secure by Letters Patent of the United States, is,—

1. A dynamo-electric machine or the like having a stationary member and a rotatable member provided with a flexible frictional driving connection adapted to exert a displacing force on said machine, and means supporting said machine and utilizing a displacing force exerted on said machine by said driving connection for increasing the friction in said driving connection, said means including a pivotal support for said stationary member having a pivotal axis parallel to the rotational axis of said rotatable member and lying in the area between the line of action of the greatest displacing force exerted on said machine by said driving connection and a plane passing through the axis of rotation of said rotatable member and the center of contact of said driving connection, said pivotal axis being located at a greater distance from said line of action of said greatest displacing force than from said axis of rotation of said rotatable member.

2. A dynamo-electric machine or the like having a stationary member and a rotatable member provided with a flexible frictional driving connection adapted to exert a displacing force on said machine, and supporting means therefor utilizing a displacing force exerted on said machine by said driving connection for increasing the friction in said driving connection, said means including a pivotal support for said stationary member having a pivotal axis parallel to the rotational axis of said rotatable member, said pivotal axis lying between the line of action of the greatest displacing force exerted on said machine by said driving connection and a plane passing through the axis of rotation of said rotatable member and the center of contact of said driving connection and being closely adjacent said axis of rotation of said rotatable member.

3. A dynamo-electric machine or the like having a stationary member and a rotatable member provided with a flexible frictional driving connection including a belt adapted to exert a displacing force on said machine, and supporting means therefor utilizing the displacing force exerted by said belt on said machine for increasing the friction on said belt, said means including a pivotal support for said stationary member having a pivotal axis parallel to the rotational axis of said rotatable member and lying between the line of force exerted on said machine by the tight side of said belt and a plane bisecting the angle of wrap of said belt, said pivotal axis being arranged at a greater distance from said tight side of said belt than from said plane.

4. A dynamo-electric machine or the like having a stationary member and a rotatable member provided with a flexible frictional driving connection including a belt adapted to exert a displacing force on said machine, and supporting means therefor utilizing the displacing force exerted by said belt on said machine for increasing the friction on said belt, said means including a pivotal support for said stationary member having a pivotal axis parallel to the rotational axis of said rotatable member and lying between the line of force exerted on said machine by the tight side of said belt and a plane bisecting the angle of wrap of said belt, said pivotal axis being closely adjacent the axis of said rotatable member.

5. A dynamo-electric machine or the like having a stationary member and a rotatable member provided with a flexible frictional driving connection including a pulley secured to said rotatable member and a belt engaging said pulley adapted to exert a displacing force on said machine, and means supporting said machine and utilizing the displacing force exerted by said belt on said machine for increasing the friction between said belt and said pulley, said means including a pivotal support for said stationary member having a pivotal axis parallel to the rotational axis of said rotatable member and being displaced from said axis of rotation a shorter distance than the radius of said pulley.

6. A dynamo-electric machine or the like having a stationary member and a rotatable member provided with a flexible frictional driving connection including a pulley secured to said rotatable member and a belt engaging said pulley adapted to exert a displacing force on said machine, and means supporting said machine and utilizing the displacing force exerted by said belt on said machine for increasing the friction between said belt and said pulley, said means including a pivotal support for said stationary member having a pivotal axis parallel to the rotational axis of said rotatable member and being displaced from said axis of rotation a shorter distance than the radius of said pulley, said pivotal axis being located between the tight side of said belt and a plane bisecting the angle of wrap of said belt and at a greater distance from said tight side of said belt than from said plane.

7. A dynamo-electric machine or the like having a stationary member and a rotatable member provided with a flexible frictional driving connection including a pulley secured to said rotatable member and a belt engaging said pulley adapted to exert a displacing force on said machine, and means supporting said machine and utilizing the displacing force exerted by said belt on said machine for increasing the friction between said belt and said pulley, said means including a pivotal support for said stationary member having a pivotal axis parallel to the rotational axis of said rotatable member and being displaced from said axis of rotation a shorter distance than the radius of said pulley and being located between the tight side of said belt and a plane bisecting the angle of wrap of said belt, said pivotal axis being closely adjacent said axis of rotation of said rotatable member.

8. A dynamo-electric machine or the like having a stationary member and a rotatable member provided with a flexible frictional driving connection adapted to exert a displacing force on said machine, means pivotally supporting said stationary member eccentrically with respect to the axis of rotation of said rotatable member and utilizing a displacing force exerted on said machine by said driving connection for increasing the driving friction in said driving connection, and means for biasing said stationary member against movement with respect to said driving connection, said last mentioned means biasing said stationary member to a position in which the line of action of said biasing means passes through the axis of rotation of said rotatable member and the axis of pivotal movement of said stationary member.

9. A dynamo-electric machine or the like having a stationary member and a rotatable member provided with a flexible frictional driving connection adapted to exert a displacing force on said machine, means pivotally supporting said stationary member eccentrically with respect to the axis of rotation of said rotatable member and utilizing a displacing force exerted on said machine by said driving connection for increasing the driving friction in said driving connection, and means biasing said stationary member against movement with respect to said driving connection, said last mentioned means acting on said stationary member at a point of greater eccentricity with respect to said axis of rotation of said rotatable member than the center of gravity of said stationary member.

10. A dynamo-electric machine or the like having a stationary member and a rotatable member provided with a flexible frictional driving connection adapted to exert a displacing force on said machine, means utilizing a displacing force exerted on said machine by said driving connection for increasing the driving friction in said driving connection, said means including a base and a pivotal connection between said base and said stationary member having its axis eccentric to the axis of rotation of said rotatable member, and means including a tension spring secured to said base and to said stationary member at a point between said base member and said pivotal connection for biasing said stationary member against movement with respect to said driving connection.

11. A dynamo-electric machine or the like having a stationary member and a rotatable member provided with a flexible frictional driving connection adapted to exert a displacing force on said machine, means pivotally supporting said stationary member and utilizing a displacing force exerted on said machine by said driving connection for increasing the driving friction in said driving connection, said means including a U-shaped cradle having its legs secured to opposite ends of said stationary member and a pivotal support for said cradle eccentric with respect to the axis of rotation of said rotatable member, and means including a tension spring secured to said cradle member between the pivotal support and the center of the cradle member for biasing said stationary member against movement with respect to said driving connection.

12. A dynamo-electric machine or the like having a stationary member and a rotatable member provided with a flexible frictional driving connection adapted to exert a displacing force on said machine, means pivotally supporting said stationary member and utilizing a displacing force exerted on said machine by said driving connection for increasing the driving friction in said flexible connection, said means including a U-shaped cradle having its legs secured to opposite ends of said stationary member, a U-shaped base conforming to said cradle, pivotal connections between adjacent legs of said cradle and base, and means including a tension spring secured to said base and to said cradle below said pivotal connections for biasing said stationary member against movement with respect to said flexible driving connection.

13. A dynamo-electric machine or the like having a stationary member and a rotatable member provided with a flexible frictional driving connection adapted to exert a displacing force on said machine, a vibration absorbing mounting for said stationary member, means pivotally supporting said mounting eccentrically with respect to the axis of said rotatable member for utilizing a displacing force exerted on said machine by said driving connection for increasing the driving friction in said driving connection, and means biasing said stationary member against movement with respect to said flexible driving connection for providing initial friction in said driving connection at starting.

14. A dynamo-electric machine or the like having a stationary member provided with hubs at its opposite ends and a rotatable member provided with a flexible frictional driving connection adapted to exert a displacing force on said stationary member, means supporting said stationary member and utilizing the displacing force exerted on said machine by said driving connection for increasing the driving friction in said driving connection, said means including resilient annuluses surrounding said hubs, a U-shaped cradle member having open ends engaging said annuluses, and a pivotal support for said cradle member eccentric with respect to the axis of said rotatable member.

15. A dynamo-electric machine or the like having a stationary member provided with hubs at its opposite ends and a rotatable member provided with a flexible frictional driving connection adapted to exert a displacing force on said machine, means supporting said stationary member and utilizing a displacing force exerted on said machine by said driving connection for increasing the driving friction in said driving connection, said means including resilient annuluses surrounding said hubs, a U-shaped cradle having open ends engaging said annuluses, a U-shaped base conforming to said cradle, pivotal connections between adjacent legs of said cradle and base members, and means including a tension spring secured to said base and to said cradle below said pivotal connections for biasing said stationary member against movement with respect to said flexible driving connection.

16. A dynamo-electric machine or the like having a stationary member provided with hubs at its opposite ends and a rotatable member provided with a flexible frictional driving connection adapted to exert a displacing force on said machine, means supporting said stationary member and utilizing a displacing force exerted on said machine by said driving connection for increasing the driving friction in said flexible connection, said means including resilient annuluses surrounding said hubs, a U-shaped cradle having open ends engaging said annuluses, a pivotal support for said cradle eccentric with respect to the axis of rotation of said rotatable member, and means including a tension spring secured to said cradle at a point between the pivotal support and the center of said cradle member for biasing said stationary member against movement with respect to said flexible driving connection.

17. A support for a dynamo-electric machine or the like comprising a U-shaped cradle provided with open ends adapted to engage projections on the machine, a U-shaped base conforming to said cradle, pivotal connections between adjacent legs of said cradle and base, and means for biasing said cradle and base to a position in alinement with each other.

18. A support for a dynamo-electric machine or the like comprising a U-shaped cradle provided with open ends adapted to engage longitudinal projections on the machine, a U-shaped base conforming to said cradle, an outwardly extending portion on each leg of said cradle, a pivotal connection between each of said portions and the adjacent leg of said base, a pair of inwardly projecting stops formed on each leg of said base, and a tension spring for biasing said cradle and base to a position in alinement with each other, said tension spring being secured to said base and to the adjacent leg of said cradle below their pivotal connection.

19. A dynamo-electric machine or the like, and a support therefor including a U-shaped cradle, a U-shaped base conforming to said cradle, aligned pivotal connections between adjacent legs of said cradle and base, and means for supporting said machine on said cradle with its center of gravity displaced a greater distance from the bottom of said cradle than the axis of said pivotal connections.

20. A dynamo-electric machine or the like and a flexible frictional driving connection therefor, means movably supporting said machine for limited movement under the influence of a displacing force exerted on said machine by said driving connection, and means effective only when said machine is at rest for biasing said machine to a position of engagement with said driving connection.

21. A dynamo-electric machine or the like and a driving connection therefor including a tensionable member, means supporting said machine for pivotal movement in a limited arc under the influence of the force exerted thereon by said tensionable member, and means effective only when said machine is at rest for biasing said machine to a position in which said tensionable member is placed under tension.

22. A dynamo-electric machine or the like having a stationary member and a rotatable member, means including a flexible frictional driving connection for exerting a displacing force on said machine, means utilizing said displacing force for increasing the friction in said driving connection, said last mentioned means including a pivotal support for said stationary member having a pivotal axis eccentric with respect to the axis of rotation of said rotatable member, and means for biasing said machine to a position with respect to said driving connection in which a small amount of slippage therein is permitted at starting.

23. A dynamo-electric machine or the like having a stationary member and a rotatable member provided with a flexible frictional driving connection including a pulley secured to said rotatable member and a belt engaging said pulley adapted to exert a displacing force on said machine, means supporting said machine and utilizing the displacing force exerted by said belt on said machine for increasing the friction between said belt and said pulley, and means for biasing said machine and pulley to a position with respect to said belt in which a small amount of slippage is permitted between said pulley and said belt at starting.

24. A dynamo-electric machine or the like having a stationary member and a rotatable member provided with a flexible frictional driving connection adapted to exert a displacing force on said machine, means utilizing a displacing force exerted on said machine by said driving connection for increasing the driving friction in said driving connection, said means including a base and a pivotal connection between said base and said stationary member having its axis eccentric to the axis of rotation of said rotatable member, and means including a tension spring secured to said base and to said stationary member for biasing said machine to a position with respect to said driving connection in which a small amount of slippage therein is permitted at starting.

25. A dynamo-electric machine or the like having a stationary member and a rotatable member provided with a flexible frictional driving connection adapted to exert a displacing force on said machine, means utilizing only said displacing force for increasing the friction in said driving connection during the loaded operation of said machine, said last mentioned means including a pivotal support for said stationary member having a pivotal axis eccentric with respect to the axis of rotation of said rotatable member, and means effective only when said machine is at rest for biasing said machine to a position of engagement with said driving connection.

26. A dynamo-electric machine or the like having a stationary member and a rotatable member provided with a flexible frictional driving connection including a belt adapted to exert a displacing force on said machine, means utilizing only said displacing force for increasing the friction on said belt during the loaded operation of said machine, said last mentioned means including a pivotal support for said stationary member having a pivotal axis eccentric with respect to the axis of rotation of said rotatable member, and means effective only when said machine is at rest for biasing said machine to a position in which said belt is placed under tension.

WILBUR W. WARNER.